Nov. 6, 1962  A. MARZOCCHI ETAL  3,062,670
GLASS REINFORCED GYPSUM
Filed Oct. 5, 1960

INVENTORS
ALFRED MARZOCCHI,
JOHN A. WAUGH &
BY ADRIEN E. BEAUDOIN

ATTORNEYS

United States Patent Office 3,062,670
Patented Nov. 6, 1962

3,062,670
GLASS REINFORCED GYPSUM
Alfred Marzocchi, Cumberland, R.I., John A. Waugh, Huntingdon, Pa., and Adrien E. Beaudoin, Central Falls, R.I., assignors to Owens-Corning Fiberglas Corporation, Toledo, Ohio, a corporation of Delaware
Filed Oct. 5, 1960, Ser. No. 60,675
7 Claims. (Cl. 106—99)

This invention relates to reinforced gypsum products and particularly to glass fiber reinforced hydrated gypsum products and a method of making them.

In the past fibrous glass has been utilized as a reinforcement for thermoplastic and thermosetting resins and for cementitious materials and various inorganic materials. Although a number of commercial uses of glass fibers as reinforcements for these materials exists, the development of improved products and methods of making the products continues. Improvement in physical properties of reinforced products is legend and many uses which have been commercially successful have exhibited improved flexural strength, improved impact strength, higher tensile strengths in addition to good appearance and smooth molded surfaces. Various patents have issued including those specific to reinforced gypsum. The Croce and Shuttleworth Patent 2,681,863 is illustrative of the past efforts made to produce satisfactory reinforced gypsum products. Fine diameter textile fibers have been used as a suitable reinforcement for gypsum plaster; gypsum plaster has been used in producing plastered walls, wall boards and various panels in building construction. Fibers of from one-eighth to one inch long and having a fiber diameter of about 0.00024 inch or commercially available textile fibers of glass have been used as the plaster reinforcement.

Reinforcing materials have been added to render plaster casts and plaster walls resistant to cracking and resistant to rough handling attendant to the usual building operations and uses. The reinforcements have been added to improve workability of plaster panels with respect to sawing, cutting and otherwise handling the plaster materials. Plaster has been reinforced to improve drillability of the cast material before or after it is installed into a building.

Various materials other than glass fibers have been used to reinforce plaster including wood fibers, saw dust, sisal fibers, asbestos, paper pulp, and many other materials. The selection of the proper reinforcing material is a continuing endeavor and it has been found that the proper selection of fiber reinforcement results in improved properties and unusual results. Although good results were obtained in the past, improved results are attained in accordance with the teachings of the present invention.

It is an object of this invention to provide an improved reinforcement for gypsum.

It is also an object to provide a means for the maximum utilization of fibrous reinforcement through maximum dispersability of the glass reinforcement.

It is a further object to provide an improved gypsum composition which can be molded into useful products.

It is also an object to provide an improved process for combining gypsum slurry with fibers to produce an improved product.

The objects of the invention are attained by providing the proper glass fiber reinforcement which is combined with gypsum to produce reinforced gypsum products having improved physical properties. It has been found that several critical factors including fiber diameter, fiber length, and proportion of fibers added to the gypsum must be considered in attaining improved physical properties of the final reinforced gypsum products. It has been found that textile fibers are not the best reinforcement for gypsum, but rather that large fibers having a diameter greater than the textile fibers which have been used formerly as reinforcements, should be used. Fibers produced by continuous fiber forming methods and chopped into the desirable length have been found satisfactory. Fibers having a diameter about ten times that of the above commercially available textile fibers have been found preferable. Good quality and uniform results are attained by utilization of chopped fibers having a diameter greater than textile fibers.

A better understanding of the improved reinforcement for gypsum is ascertainable from an inspection of the drawings wherein.

Figure 1:
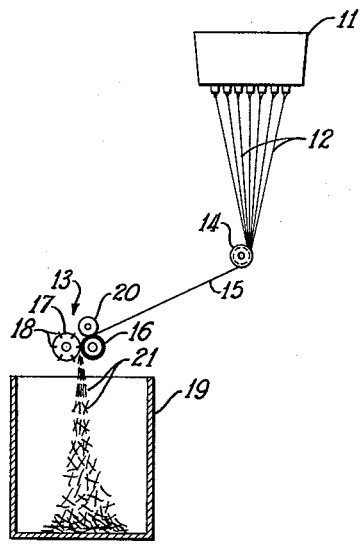
FIGURE 1 is a view of a continuous process for producing chopped fibers.

Suitable fibers having a diameter of from about 0.001 to about 0.005 inch are produced continuously and chopped into the desired lengths with apparatus such as that shown in FIGURE 1. Molten glass is flowed from a feeder 11 in the form of multiple streams which are attenuated into fibers 12, 12 as they are advanced by the action of the chopper 13. The fibers 12 are gathered upon a gathering wheel 14 and the bundle of fibers 15 is then advanced into chopper 13 which comprises a rubber-covered roll 16, a cutting roll 17 which has upon its periphery a plurality of blades 18, and a drawing roll 20.

Treating materials can be applied to the fibers at the gathering wheel or can be applied by roll application to the fan of fibers before they are gathered. These treatments may be widely varied, but when used they are normally material which couple the glass to the cement. Slurries or solutions of calcium compounds can be used for this purpose. Calcium compounds such as calcium hydroxide and calcium sulfate can be applied by dripping an aqueous solution onto the fibers at the gathering wheel. Various other materials such as sequestering agents like ethylene diamine tetracetic acid, polyamines such as polyethylene amine, polyvinylpyrrolidone, polyvinylpyridine, polyamides such as one commercially available as Suspensoid A–000, gelatins, glues, polyacrylamides, and others may be applied if desired. The various treatments are not essential, however, and do not act as a binder for bonding the fibers together. Rather, it is desirable to retain the fibers as separate unbonded entities which can be readily dispersed in gypsum slurries.

In utilizing the apparatus, molten glass is allowed to form beads which then drop from the individual orifices within feeder 11 and the beads pull a fiber behind them. These fibers are pulled downwardly by hand and placed upon gathering wheel 14 and directed into the rolls of cutter 13. The fibers are advanced by the action of the cutter and the cutter chops the individual fibers of the bundle into fibers of the desired length which are then collected in container 19. Chopped fibers 21 are either collected for shipment or they are introduced, as they are being formed, into a gypsum slurry, see FIGURE 2. These fibers are formed at speeds considerably less than those normally used in the production of commercially available textile fibers. Otherwise conventional fiber forming techniques are followed with only minor modifications being made, if any.

Figure 2:
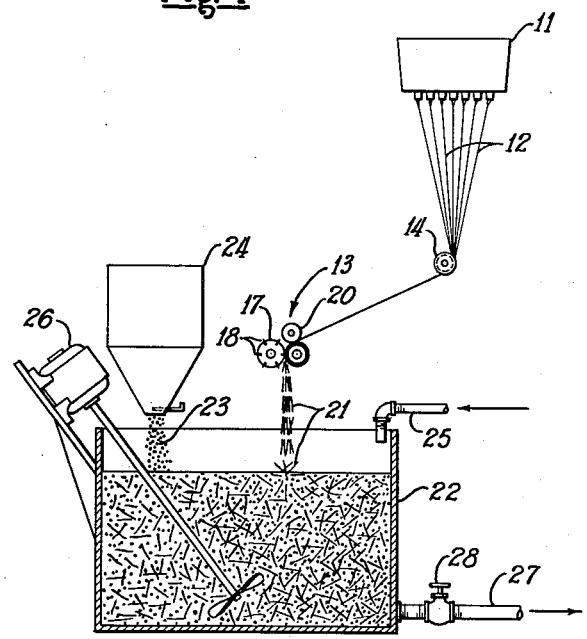
FIGURE 2 is a view of apparatus for producing a gypsum and fiber slurry continuously as the fibers are produced.

In FIGURE 2, chopped fibers 21 are produced with equipment similar to that of FIGURE 1 and these fibers are introduced into mixing tank 22 along with gypsum 23 from a suitable hopper 24 and water which is introduced through inlet 25. Mixing tank 22 is provided with a motor driven propeller-stirrer 26 which accomplishes thorough mixing to form a uniform dispersion. The product is removed from the mixing tank 22 through outlet 27 by opening valve 28.

The apparatus of FIGURE 2 can be run continuously or on a batch basis. The fiber forming apparatus can be started up and run only as needed or it can be run continuously. There are advantages in continuous operation of the feeder and if it is deemed desirable to operate continuously, the chopped fibers can be shunted to suitable collection boxes during any periods that fibers are not needed in the mixing tank. The gypsum and water can be metered into the tank as needed. The rate of feed can be maintained constant for each of the three materials being fed to the tank and the rate of removal of product can be likewise kept constant to secure a uniform product. The product from the apparatus of FIGURE 2 can be sent to storage tanks where the slurry is adjusted and agitation is continued to supply a product of uniform consistency and makeup. If desirable, the product from the original mixing tank 22 can be directed into molds in which panels are produced or handled in any other suitable way in forming final products.

Any number of fibers may be formed from a single feeder. A single fiber can be formed and chopped or 204, or 408 fibers, or more can be formed from conventional feeders and pulled at a rate slower than the usual pulling rates for forming textile fibers. The slower pulling rates will result in fiber diameters which are larger than those of conventional textile fibers. For instance, fiber diameters of from 3 to 5 thousandths of an inch have been found preferable. These diameters are about 10 times that of any conventional, commercially available textile fibers; textile fibers vary from "B" fiber which has a diameter of 0.00010 inch to "P" fiber which has a diameter of about 0.00075 inch. The fiber lengths should vary from about one-quarter of an inch to one inch and the percentage of fibers added may vary from about three-tenths of a percent to as high as three percent.

The fibers and B-11 Hydrocal, a calcined gypsum, are dry mixed in a Hobart dough-type mixer to obtain a uniform mixture of these two components. Water, at room temperature, is added to the dry mixture and mixing is continued until the fibers are flocculated.

The slurry is poured into a mold and after the molded piece becomes set, it is removed and then placed in an enclosure for treatment at a high relative humidity atmosphere. The molded parts are retained in the conditioning atmosphere until they maintain a constant weight. The following table sets forth proportions of ingredients in reinforced molded parts and physical properties of these moldings. Textile fiber reinforcements were also used, but dispersions could not be successfully prepared as indicated. All measurements of physical properties were made on test bars that were one inch by one-half inch thick and twelve inches long.

| Molding | Percent Fibers | Avg. Fiber Diameter | Fiber Length, inches | Flexural Strength, p.s.i.×10³ |
|---|---|---|---|---|
| 1 | 0.5 | 0.003 | 1 | 1.40 |
| 2 | 3.0 | 0.003 | 1 | 1.51 |
| 3 | 1.0 | 0.003 | 1 | 1.22 |
| 4 | 2.0 | 0.003 | 1 | 1.30 |
| 5 | 0.5 | 0.00035 (140's) | 1 | (*) |
| 6 | 1.0 | 0.00035 | 1 | (*) |
| 7 | 2.0 | 0.00035 | 1 | (*) |
| 8 | 3.0 | 0.00035 | 1 | (*) |

*Dispersion cannot be prepared.

The increased flexural strength provided by the use of three mil fibers as the reinforcement make it possible to reduce the required thickness of panels utilizing such fibers for reinforcement. Such reduction in thickness allows the use of a higher percentage of fibers without actual increase in cost. Ease of handling is an added feature resulting from the increased flexural strength of the panels.

A great advantage of large diameter fibers resides in the increased resistance to alkali attack which they exhibit over smaller diameter fibers. The increased resistance is a function of the decreased surface to mass ratio of the larger diameter fibers. The decreased alkali attack is important in gypsum reinforcements and also very important in reinforcements for Portland cement.

Another advantage of these fibers which are ten times the diameter of conventional textile glass fibers becomes apparent when mixing the fibers with gypsum, Portland cement, magnesium oxysulfate, magnesium oxychloride, or other cement to form a slurry. It has been found that 0.1% of 140s textile fibers (0.0004") cannot be admixed with a gypsum slurry while 3% of 0.003" diameter fibers can be added to a moldable gypsum slurry with ease. Large diameter fibers are easier to disperse in a slurry, they resist alkali attack to a much greater extent once they are in the cement product, and they provide excellent strengths in molded products.

It has been found that fibers having an average diameter of from 0.003 to 0.005" and a fiber length of from ¼" to 1" are preferred, thus a fiber diameter to fiber length ratio of from 0.020 to 0.003 is derived as follows:

$$Rd_1 = \frac{\text{diameter of fibers}}{\text{length of fibers}}$$

$$Rd_1 = \frac{D}{L}$$

$$Rd_1 = \frac{0.003}{\frac{1}{4}} = 0.012$$

$$Rd_1 = \frac{0.003}{1} = 0.003$$

$$Rd_1 = \frac{0.005}{\frac{1}{4}} = 0.020$$

$$Rd_1 = \frac{0.005}{1} = 0.005$$

The three mil to five mil fibers disclosed as reinforcements for gypsum are also advantageously used as reinforcements for plastics, resins, asphalts and the like.

In addition to forming dispersions of individual, large diameter fibers, in accordance with the above teachings, to produce moldings, these fibers can be used as surface treatments for uncured panels to provide fiber-rich upper and/or lower surfaces. In the surface use, complete dispersions are not sought and other surfacing fibers can be used in addition to the large diameter fibers of this invention. For instance, very fine diameter fibers are conventionally utilized to provide smooth surfaces in molded plastic. Along with the surfacing fibers sprayed deposits of urea formaldehyde, melamine formaldehyde phenolics, or epoxy resins can be applied to the gypsum and fiber panels.

The reinforced gypsum compositions are utilized as wall boards, ceiling panels, moldings, structural boards and the like.

Although preferred embodiments of the invention have been set forth, it is not intended that the invention be limited thereto, but rather to include modifications and variations within the scope of the following claims.

We claim:
1. A composition consisting essentially of gypsum plaster reinforced with glass fibers having an average diameter of from about 0.003" to 0.005" and a ratio of fiber diameter to fiber length of from 0.003 to 0.020, said fibers comprising from 0.3 to 3% by weight of the total composition.

2. A composition consisting essentially of calcined gypsum reinforced with glass fibers having an average diameter of from about 0.003" to 0.005", and a fiber diameter to fiber length ratio of from about 0.003 to 0.020, said composition when mixed with water forming a moldable and settable slurry.

3. Method of producing reinforced gypsum comprising mixing calcined gypsum with glass fibers to obtain a uniform mixture, said fibers having an average diameter of from about 0.003" to 0.005" and a fiber diameter to fiber length ratio of from about 0.003 to 0.020, adding sufficient water to this mixture to form a moldable slurry, and pouring this mixture into a mold where it advances to a set condition.

4. A molded panel consisting essentially of set gypsum plaster reinforced with glass fibers having a diameter of from 0.003" to 0.005" and a fiber diameter to fiber length ratio of from about 0.003 to about 0.020, said fibers comprising from 0.3 to 3% by weight of the panel.

5. A reinforced gypsum product consisting essentially of large diameter, glass fibers dispersed uniformly throughout the product, said fibers comprising from 0.3 to 3% by weight of the total product and having a fiber diameter to fiber length ratio of from 0.003 to 0.020 and an average diameter of from 0.003" to 0.005".

6. An inorganic cement molded product reinforced with uniformly dispersed, large diameter, glass fibers, said fibers comprising from about 0.3 to 3% by weight of the total product and having a fiber diameter to fiber length ratio of from 0.003 to 0.020 and an average diameter of from 0.003" to 0.005".

7. A glass fiber reinforced molding consisting essentially of an inorganic cement reinforced with from 0.3 to 3% by weight of individual fibers having a fiber diameter to fiber length ratio of from 0.003 to 0.020 and an average diameter of from 0.003" to 0.005".

References Cited in the file of this patent

UNITED STATES PATENTS

| | | |
|---|---|---|
| 2,738,285 | Biefeld et al. | Mar. 13, 1956 |
| 2,744,022 | Croce et al. | May 1, 1956 |
| 2,871,134 | Loechl | Jan. 27, 1959 |